March 18, 1969 J. J. MUSGROVE 3,433,003
MOWING MACHINE

Filed March 23, 1966 Sheet 1 of 2

INVENTOR:
JOHNNIE J. MUSGROVE
BY R. Russell Foster
ATTORNEY

March 18, 1969     J. J. MUSGROVE     3,433,003
MOWING MACHINE
Filed March 23, 1966
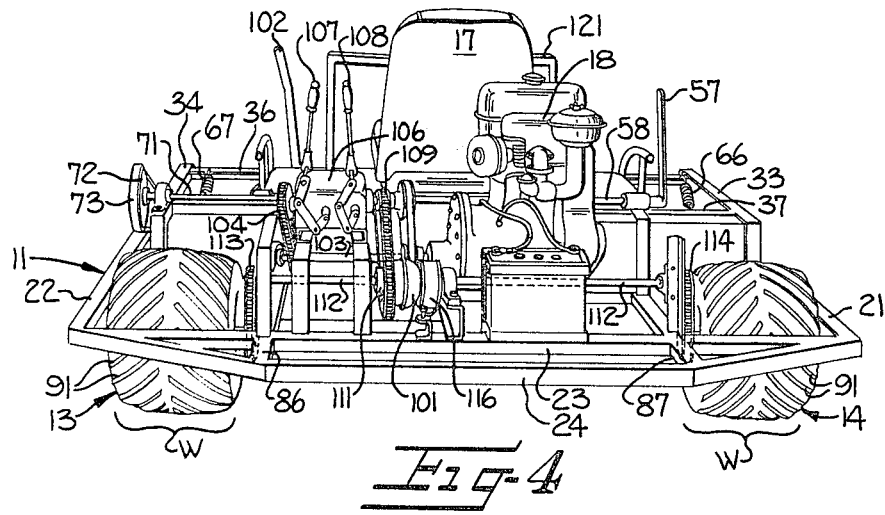
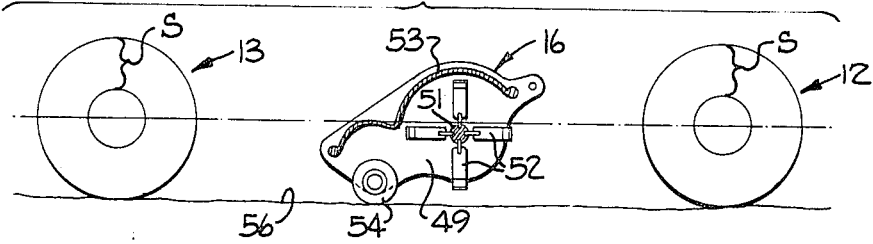
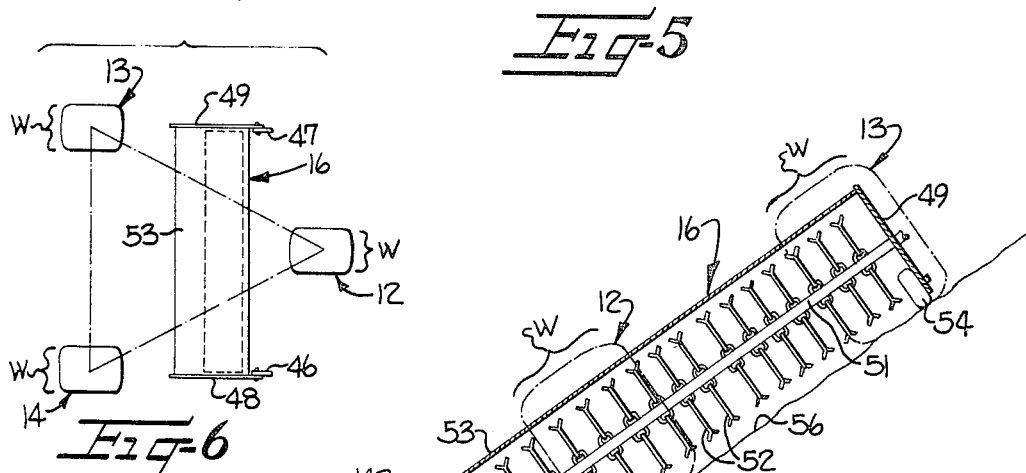
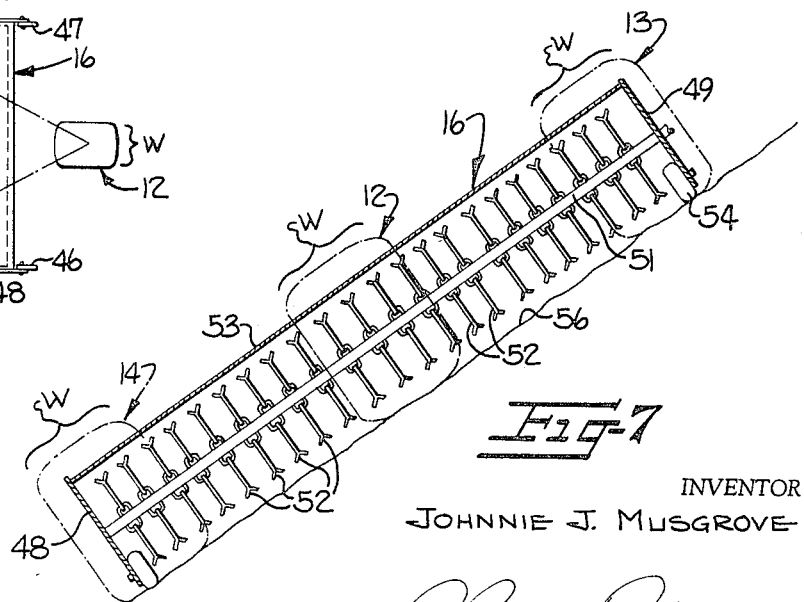
INVENTOR:
JOHNNIE J. MUSGROVE
BY T. Russell Foster
ATTORNEY United States Patent Office 3,433,003
Patented Mar. 18, 1969

3,433,003
MOWING MACHINE
Johnnie J. Musgrove, Charleston Heights, S.C.
(1604 Amberly Road, Charleston, S.C. 29407)
Filed Mar. 23, 1966, Ser. No. 536,800
U.S. Cl. 56—26                                    1 Claim
Int. Cl. A01d 35/24

ABSTRACT OF THE DISCLOSURE

A three wheeled tricycle type vehicle having low pressure type tires, a rotary cutting device supported by said vehicle and power means for operating said vehicle and cutting device.

---

This invention relates to mowing machines and more particularly to a rider steering, power driven mower for cutting both flat and sloping terrain.

A variety of types of machines for mowing or cutting grass and similar growth are in use today which vary from the well known and widely used rider steered lawn-mower up to the heavy duty larger units such as tractors equipped with sickle bars, rotary cutters and the like for rapidly cutting large areas of terrain. All of such mowing machines regardless of type are designed primarily for and have their widest application in the cutting of relatively even or flat terrain. In general, attempts to use such mowing machines on sloping terrain having slopes up to 45° or more have not proven successful. The high center of gravity of such mowers or the tractors employed with such mowers create a high degree of instability and the cutting of relatively steep slopes has resulted in frequent overturning of the mowers or tractors with resultant damage and personal injury. In addition, the heavy weight and the large diameter wheels used on such mowers and, in particular, on tractors pulling sickle bars and roller cutters cause considerable damage to the turf on the slopes with resultant marring of the slope appearance and the creation of a severe soil erosion problem.

The above problem encountered in cutting slopes with conventional type present day mowers is greatly magnified in the case of grass covered, elevated earthen mounds in which ammunition is stored or what is generally referred to as "ammunition storage magazines." The sides of such magazines generally slope at an angle of 45° or greater and attempts to cut these magazine slopes with any one type of conventional mowing equipment have proven completely unsuccessful as a result of the almost certain overturning of the mower and damage to the turf as discussed above or even simply failure of the mower to negotiate the slope.

Attempts have been made to modify present day mowers for cutting such steep slopes with virtually no success. Consequently, at the present time, the grass on such magazines is generally cut by using a tractor-drawn sickle bar on the lower part of the magazine side slopes with the upper part of the slopes being cut by hand. Many such magazines are provided with flat areas on their tops which are either cut by hand or with a tractor equipped with a rotary cutter. This, of course, means that more than one type of mower must be available for such a mowing operation at least one of which types being of high initial cost. Furthermore, the mowing of grass on such magazines has been an extremely expensive and time consuming operation, injuries frequently result and the resulting appearance of the magazine turf using present day equipment has failed to provide the expected results from the standpoint of appearance.

Accordingly, a primary object of this invention is to provide a new and novel mowing machine suitable for mowing relatively steep slopes.

Another object of this invention is to provide a new and novel mowing machine which may be used interchangeably for cutting either flat terrain or relatively steep slopes such as the type found on ammunition storage magazines, road shoulders and drainage ditches.

A further object of this invention is to provide a new and novel mowing machine which not only may be used to mow flat terrain but which may be employed to mow slopes sloped at an angle of 45° or even greater but which is virtually free from risk of overturning so as to eliminate possible damage or personal injury and which at the same time eliminates any risk of destruction to the turf being mowed.

Still another object of this invention is to provide a new and novel mowing machine for mowing both flat terrain and steep slopes which is low in cost and simple in construction, which has a low center of gravity, which utilizes pneumatic tires of great width, low pressure and large air volume so as to provide a high degree of stability for the mowing machine.

This invention further contemplates the provision of a new and novel rider steered, power driven mowing machine of three wheel construction which may incorporate any well known type of cutting unit, which is characterized by a high degree of stability while being suitable for cutting both flat and unusually steep slopes and which is capable of cutting both slopes and flat terrain successively in a neat efficient manner in a minimum of time and which may be operated by a relatively unskilled operator without risk of injury or damage to produce a mowed surface of uniform attractive appearance.

Other objects and advantages of the invention will become apparent from the following description taken in connection with the accompanying drawings.

The objects stated above and other related objects in this invention are accomplished by providing a mowing machine which includes a frame of box construction having side edges which frame is substantially rectangular in cross sectional shape. The frame is supported at the front by at least one rotatably mounted wheel and at the rear by a pair of driving wheels each rotatably supported at a rear corner of the frame in oppositely disposed relationship thereby providing a three wheel frame support. A horizontally disposed cutter is positioned on the frame between the front and rear wheels. The rear wheels each include a rim of relatively small diameter and a cylindrical, low pressure pneumatic tire on the rim having a width substantially greater than the radial width of the tire side wall. The diameter of the rim is such that its center corresponds substantially to the bottom of the frame and the horizontal axis of the cutter so as to provide a low center of gravity for the mowing machine. A motor is supported on the frame which is drivingly connected by suitable means to the rear wheels and to the cutter. Also positioned on the frame intermediate the front and rear wheels is an operator's seat and means accessible from the operator's seat are connected to the front wheel for steering the mowing machine.

The novel features which are believed to be characteristic of the invention are set forth with particularity in the appended claims. The invention itself, however, both as to its organization and method of operation may be best understood by reference to the following description taken in conjunction with the accompanying drawings in which:

FIGURE 4 is a rear view of the machine of FIGURE 1;

FIGURE 5 is a partial side view illustrating the relative position of the wheels and cutter of the machine of FIGURE 1;

FIGURE 6 is a plan view of the components shown in FIGURE 5 similarly illustrating their relative position; and FIGURE 7 is a sectional view of the machine of the invention illustrating the cutter in an operating position.

Figure 1:
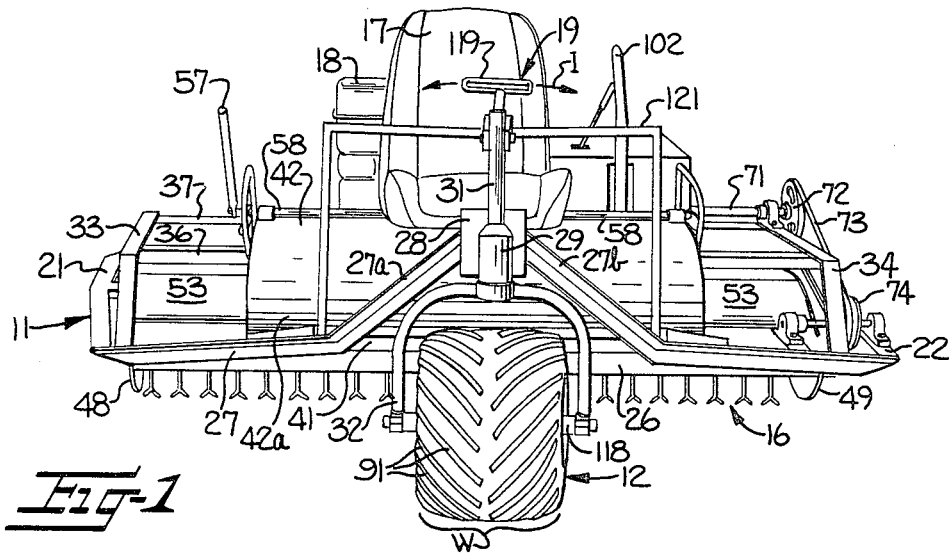
FIGURE 1 is a front view of the mowing machine of the invention.

As generally illustrative of the invention, the mowing machine of the invention as shown in the drawings includes a frame designated generally by the numeral 11 which is of box construction and substantially rectangular in cross sectional shape. The frame 11 is supported at the front by at least one front wheel 12 and at the rear by a pair of operatively disposed rear wheels 13, 14 each supported at a rear corner of the frame. A cutter 16 is supported on the frame 11 intermediate the front wheel 12 and the rear wheels 13, 14. The mowing machine of the invention is of the rider steered, power driven type and includes an operator's seat 17 and power means 18 for driving the rear wheels 13, 14 both supported on the frame 11. Means designated generally by the numeral 19 and accessible from the operator's seat 17 are provided for steering the mowing machine of the invention through the front wheel 12.

As specifically illustrative of the invention, the frame 11 which is of box construction and of substantially rectangular cross sectional shape is provided with side edges formed by side frame members 21, 22. The side frame members 21, 22 are positioned so as to define generally therebetween the bottom of the frame 11. The side frame members 21, 22 are interconnected by transversely extending cross members such as rear cross member 23 to which is preferably connected a U-shaped cross member 24, intermediate cross members 25, 26, and a front cross member 27 having centrally arranged inclined portions 27a, 27b as shown best in FIGURE 1. The upper ends of the front cross member portions 27a, 27b are secured such as by welding or the like to a block 28 in an inverted V-shaped relationship and the block 28 is provided with a socket 29 which receives the shank 31 of a Y-shaped yoke 32 in which the front wheel 12 is mounted.

Figure 2:
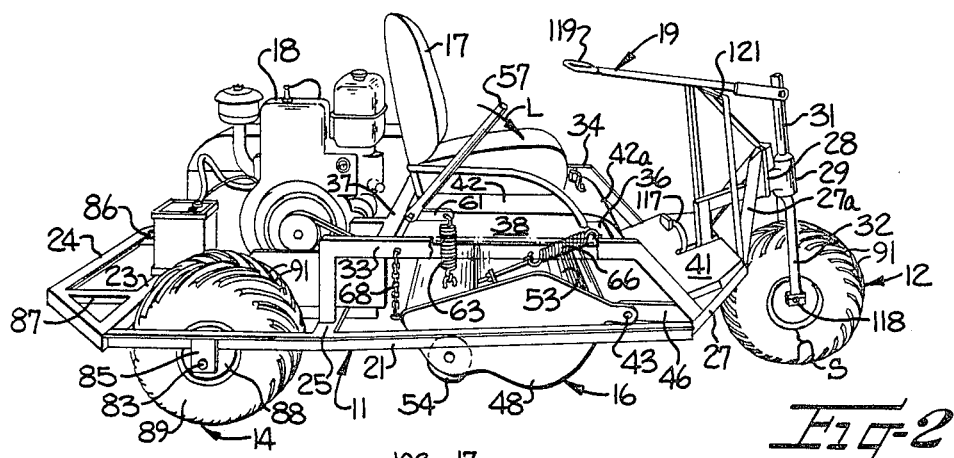
FIGURE 2 is a side view of one side of the machine of FIGURE 1.
Figure 3:
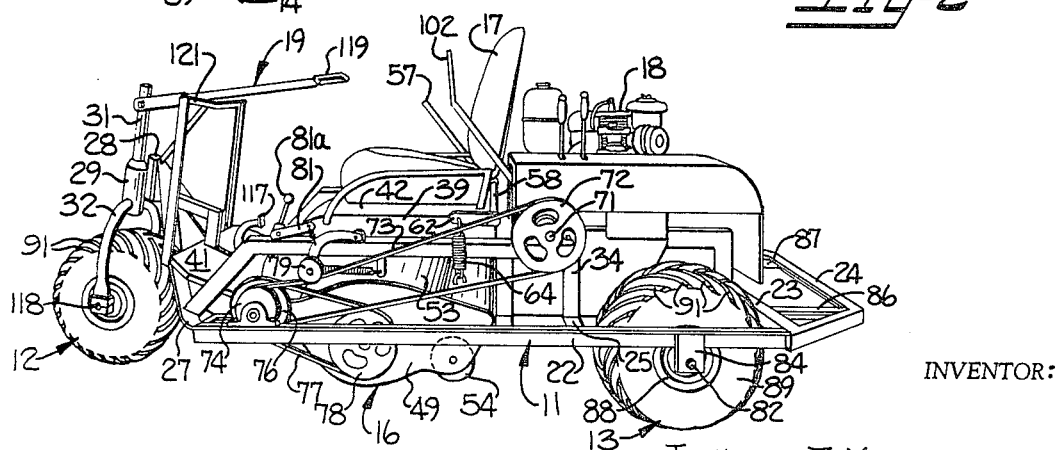
FIGURE 3 is a side view of the other side of the machine of FIGURE 1.

Along each side of the frame 11, there is positioned vertically extending side frames 33, 34 substantially of inverted U-shaped configuration as shown best in FIGURES 2, 3. The side frames 33, 34 are disposed slightly inward of the side frame members 21, 22 and have their free ends suitably secured by welding or the like to the frame intermediate cross member 25 and front cross member 27 as shown.

The upper portion of the side frames 33, 34 are interconnected by front and rear cross members 36, 37 between which bracing members 38, 39 are positioned as shown. A foot plate 41 is positioned on the front cross member 27 between the side frames 33, 34 as shown and a cover plate 42 having an arcuate front portion 42a extends between the side frames 33, 34 on which is suitably supported the operator's seat 17.

The cutter 16, which may be of any suitable type, is mounted on the frame 11 between the side edges defined by the side frame members 21, 22 and intermediate the front wheel 12 and the rear wheels 13, 14. The cutter 16 may be of any suitable type such as a rotary blade type, reel type, etc. and in the preferred embodiment is of the hammer knife or flail type as shown best in FIGURES 5, 7. The disposition of the cutter 16 relative to the front wheel 12 and rear wheels 13, 14, is shown best in FIGURE 6 wherein a three-wheel support for the mowing machine of the invention is provided with the cutter 16 intermediate the front and rear wheels in substantially parallel relationship with the axis of the rear wheels 13, 14.

The cutter 16 is preferably pivotally mounted at 43, 44 to support brackets 46, 47 suitably secured to the adjacent portions of the frame members of frame 11 as shown. The cutter 16 includes side plates 48, 49 between which is rotatably supported a shaft 51 as shown best in FIGURE 7. As is well known, in the hammer knife type of cutter, a plurality of uniformly spaced flails or knives 52 are pivotally mounted as shown best in FIGURES 5, 7 on the shaft 51 so that rotation of the shaft 51 produces a cutting action on the grass or other growth by the flails 52. The cutter 16 is also provided with a cover plate 53 suitably secured at each end to the cutter side plates 48, 49. The cover plates 48, 49 are also provided with freely rotatable suitably mounted rollers or wheels 54 which prevent contact between the cutter flails 52 and the ground 56 beneath the mowing machine.

As shown best in FIGURE 5, it can be seen that the centers or hubs of the wheels 12–14 correspond substantially to the horizontal axis of the cutter defined by the cutter shaft 51. It will also be noted that the bottom of the frame 11 defined by the side frame members 21, 22 similarly correspond to the hubs of the wheels 12–14 both of which construction features produce a very low center of gravity for the mowing machine of the invention.

The cutter 16 is thus arranged to be pivoted between the inoperative position of FIGURES 2, 3 into an operative position as shown in FIGURES 5, 7 for cutting the grass or other growth beneath the machine.

Means are provided for moving the cutter between the inoperative position and the cutting position and means are provided for resiliently supporting the cutter in the cutting position. More specifically, as shown best in FIGURE 2, a cutter operating lever 57 is provided which is disposed adjacent the operator's seat 17. The lever 57 is connected to a transversely extending rotatably mounted shaft 58 from the opposite ends of which extend transversely spaced radially extending arms 61, 62. The arms 61, 62, each of which is positioned adjacent one end of the cutter 16 having a free end connected to one end of vertically extending springs 63, 64 respectively the lower ends of which is suitably attached to the plate 53 of cutter 16.

Adjacent each of the springs 63, 64 are springs 66, 67 suitably attached at one end to the side frames 33, 34 respectively and at their other end to the cutter cover plate 53 as shown. Thus, by manipulating the lever 57 in the direction of the arrow L, the cutter 16 is moved from the inoperative position of FIGURES 2, 3, into the operative position of FIGURES 5, 7 the cutter being suitably supported at the desired height resiliently by the springs 63, 64, 66 and 67. Preferably, suitable means such as a chain 68 as shown best in FIGURE 2 is provided for limiting the downward movement of the cutter 16 to the cutting position to thereby avoid engagement between the cutter knives 52 and the ground 56.

Means are provided for driving the cutter from the power means 18 which, in the illustrated embodiment, is an internal combustion engine of conventional type suitably supported on the frame 11. More specifically, a shaft 71 is connected by suitable means to the output shaft of the motor 18. A pulley 72 is positioned on the outer end of the shaft 71 and is connected by means of a belt 73 to a pulley 74 mounted together with pulley 76 for rotation on the side frame member 22 as shown in FIGURE 3. A second belt 77 is connected between the pulley 76 and a pulley 78 mounted on one end of the cutter shaft.

An idler pulley 79 is pivotally supported as shown on side frame 34 and is arranged to be moved between an elevated position by means of a control linkage 81 which includes a handle 81a into engagement with the belt 73 to tension the belt on the pulleys 72, 74. Thus, when the idler pulley 79 is in the position of FIGURE 3, a driving connection is obtained between the motor 18 and the cutter shaft 51 through the belts 73, 77 rotating the cutter for a cutting operation.

In the illustrated embodiment of the mowing machine of the invention, the single front wheel 12 is used for steering and as previously explained the rear wheels 13, 14 are the driving wheels. An outstanding feature of the invention is the construction of the driving wheels 13, 14 which are mounted in oppositely disposed relationship at the rear corners of the frame 11. Although the rear wheels 13, 14 may be mounted on a single axle, they are preferably mounted on stub shafts 82, 83 so that each rear wheel 13, 14 is independently supported. Shaft 82 and consequently the wheel 13 is supported between side frame member 22, the connection to which is preferably accomplished by a bracket 84, and a longitudinally extending inner frame member 86 and wheel 14 between side frame member 21, the connection to which is preferably accomplished by a bracket 85, and longitudinally extending inner frame member 87.

Rear wheels 13, 14 are identical in construction and consequently like numerals will be used to identify like parts. Each rear wheel 13, 14 includes a rim 88 of relatively small diameter on which is positioned a cylindrical, low pressure pneumatic tire 89. In accordance with the novel construction of the invention, the width W of the rear tires 89 as shown in FIGURE 4 is substantially greater than the radial width of the tire side wall as identified by the letter S in FIGURE 2 to thereby provide a high air volume for the tires. Preferably, the width W of the rear tires 89 is a multiple of the radial width S of the tire side wall.

The type of tire which is incorporated in the rear wheels 13, 14 is a commercially available tire referred to as the "Terra-tire" which is manufactured by the Goodyear Tire and Rubber Company of Akron, Ohio. Such "Terra-tires" are characterized by high flotation characteristics and flexibility due to the low pressure (as low as 2 p.s.i.), a large air volume and a very small ground pressure per square inch.

These tires, which are preferably provided in the illustrated embodiment with treads 91, are unusually wide having a width of 42" or more and an extra small bead diameter which may be as small as 6". In the illustrated embodiment of the invention, the rear tires 89 have a width W within the range of between 12 to 24 inches, an outer diameter within a range of between 12 to 24 inches, and a rim diameter within the range of 6 to 10 inches. In one form of the invention, the outer diameter of the tires 89 on the rear wheels is a multiple of the outer diameter of the rim 88. The use of such a tire for the rear wheels of the mowing machine of the invention provides a high degree of stability and completely eliminates damage to the turf over which the mowing machine is driven.

The motor 18 is also employed to drive the rear wheels 13, 14, and means are provided for drivingly connecting the motor 18 to the rear wheels 13, 14. More specifically, as shown best in FIGURE 4, the output shaft of the motor 18 is connected to a clutch 101 controlled from the driver's seat by a clutch lever 102. The other side of the clutch 101 is connected by means of a shaft 103 to a chain and sprocket arrangement 104 connected to the input shaft of a transmission 106. As illustrated, the motor 18 and transmission 106 is suitably supported on the frame 11.

The transmission 106 is controlled in the usual manner from the operator's seat 17 by shift levers 107, 108 and has its output shaft connected by means of a chain and sprocket assembly 109 to a differential 111 on a transversely extending jackshaft 112. The ends of the jackshaft 112 are connected by means of chain and sprocket assemblies 113, 114 to the rear wheels 13, 14 so that each independently supported wheel is driven off the jackshaft. A brake 116 is also provided which is connected by means of a brake rod (not shown) to a brake pedal 117 extending through the foot plate 41 adjacent the driver's seat 17 as shown best in FIGURE 2.

Although the front wheel 12 may be of any suitable construction, it is preferably identical in construction to the rear wheels 13, 14 and like numerals have been used on the front wheel 12 to identify like parts. The front wheel 12 is rotatably supported centrally intermediate the frame side edges 21, 22 on a shaft 118 the outer ends of which are connected to the free ends of the yoke 32 as shown best in FIGURE 1. The front wheel 12 is thus mounted for pivotal movement through the yoke 32 forming a part of the steering means 19 by means of which the mowing machine of the vehicle is steered.

The steering means for the mowing machine preferably includes an operating handle 119 accessible from the driver's seat 17 which is connected to the upper end of the shank 31 of the yoke 32 and rests preferably on an inverted U-shaped support 121 as shown best in FIGURES 2, 3. As the yoke shank 31 pivots freely in the socket 29 of block 28, the steering handle 119 may be shifted in either direction as indicated by the double arrow I of FIGURE 1 thereby pivoting the front wheel 12 to steer the mowing machine.

In the operation of the mowing machine of the invention, the motor 18 is started with the clutch 101 disengaged. The operator, who occupies the seat 17, then shifts the transmission 106 into the selected gear by means of levers 107, 108 and the rear wheels 13, 14 are connected in driving engagement with the motor 18 by shifting the clutch lever 102 to engage clutch 101.

Belt 73 is then tensioned on pulleys 72, 76 by pivoting the roller 79 into engagement with the belt 73 with the linkage operating handle 81a. When cutting is to be initiated, the lever 57 is moved to pivot the cutter 16 downwardly into cutting position, the cutter being resiliently supported on the springs 63, 64 and 66, 67 at the desired cutting height. Thus, the mowing machine is operated to cut grass and other growth over which the machine travels. The mowing machine is steered by appropriately turning the steering arm 119 to pivot the front wheel 12 in the appropriate direction.

It can be seen that with the novel construction of the machine of the invention, a mowing machine has been provided with a very low center of gravity which positively eliminates any overturning of the machine when the machine is operated on relatively steep slopes. The major contribution to the stability of the machine is obtained through the use of the extremely wide rear tires and the front tire also which not only impart a high degree of stability to the machine but which are so flexible and yieldable while providing a large area of contact with the ground that there is virtually no damage to the turf even when cutting unusually steep slopes. The three-wheel construction of the mowing machine of the invention together with the centrally mounted cutter and relatively wide tires completely eliminate any twisting of the frame so that the machine follows the contour of the slope exactly. Thus, thorough and efficient cutting of slopes is obtained.

The mowing machine of the invention is far less expensive in construction than present day machines being composed of inexpensive, readily available parts so that the machine is of relatively low weight further eliminating damage to the turf and together with its high degree of stability permit the machine to operate on slopes at a relatively high speed. It has been found that the machine may be operated efficiently at speeds of approximately 2–3 miles per hour on slopes and approximately 5–6 miles per hour on level ground.

The most outstanding feature of the mowing machine of the invention is its ability to negotiate slopes ranging from 45 to 65 degrees or even more with no risk of overturning while performing an efficient cutting operation. Furthermore, the mowing machine of the invention may be operated interchangeably on steep slopes or flat ground or any intermediate formation with no modification and at the same time performs the cutting operation in far less time than that required using present day machines. Thus, the machine is particularly suitable for use in relatively steep ground areas such as ammunition storage magazines which not only have steep sloping sides together with a flat top all of which areas must be cut but is equally suitable for performing a cutting operation on road shoulder embankments, areas around drainage ditches, and any type of flat terrain.

While there has been described what at present is considered to be the preferred embodiment of the invention, it will be understood by those skilled in the art that various changes and modifications may be made therein without departing from the invention and therefore it is the aim of the appended claim to cover all such changes and modifications as fall within the true spirit and scope of the invention.

Having thus described the invention, what is claimed is:

1. A rider steered, power driven mowing machine comprising, in combination, a frame having side edges and a bottom, at least one rotatably mounted front wheel for supporting the front of said frame, a pair of driving rear wheels each rotatably supported at a rear corner of said frame in oppositely disposed relationship for supporting the rear of said frame, a horizontally disposed cutter positioned on said frame between said front and rear wheels, said rear wheels including a rim of relatively small diameter and a cylindrical, low pressure pneumatic tire on said rim, said rear tires having a width substantially greater than the radial width of the tire side wall to thereby provide a high air volume, said rim having a center corresponding substantially to the bottom of said frame and the horizontal axis of the cutter so as to provide a low center of gravity for said mowing machine, power means supported on said frame, means for drivingly connecting said power means to said rear wheels and to said cutter, an operator's seat on said frame intermediate said front and rear wheels, means accessible from said operator's seat for steering said mowing machine, wherein said front wheel is of substantially the same construction as said rear wheels and is pivotally mounted for free rotation centrally of the side edges of said frame to provide with said rear wheels a three-wheel support for said frame, and wherein said steering means includes a steering handle connected to said front wheel and positioned forwardly of said operator's seat for steering said mowing machine, and wherein said power means includes a motor having an output shaft and including a stub shaft at each of the rear corners of said frame for independently supporting each of said rear wheels for rotation, and wherein said connecting means includes a clutch connected to the output shaft of said motor, a transmission and a differential and wherein the width of said front and rear tires is a multiple of the radial width of the tire side wall and including means for moving said cutter between an inoperative position and a cutting position, spring means connected to said frame and said cutter for resiliently supporting said cutter in said cutting position, means for positively limiting the movement of said cutter into said cutting position and ground engaging means on said cutter for preventing the cutter from engaging the ground.

References Cited

UNITED STATES PATENTS

| | | | |
|---|---|---|---|
| 2,711,067 | 6/1955 | Mott | 56—26 X |
| 2,732,675 | 1/1956 | Smith et al. | 56—25.4 X |
| 2,862,343 | 12/1958 | Wood | 56—25.4 |
| 3,269,100 | 8/1966 | Smith | 56—25.4 |

OTHER REFERENCES

Popular Science: December 1961, pp. 138 to 142.

RUSSELL R. KINSEY, *Primary Examiner.*